Jan. 9, 1968  W. KASTEN  3,362,535
FILTER UNIT
Filed Sept. 27, 1965  3 Sheets-Sheet 1

INVENTOR.
WALTER KASTEN.
BY
*William N. Antonis*
ATTORNEY.

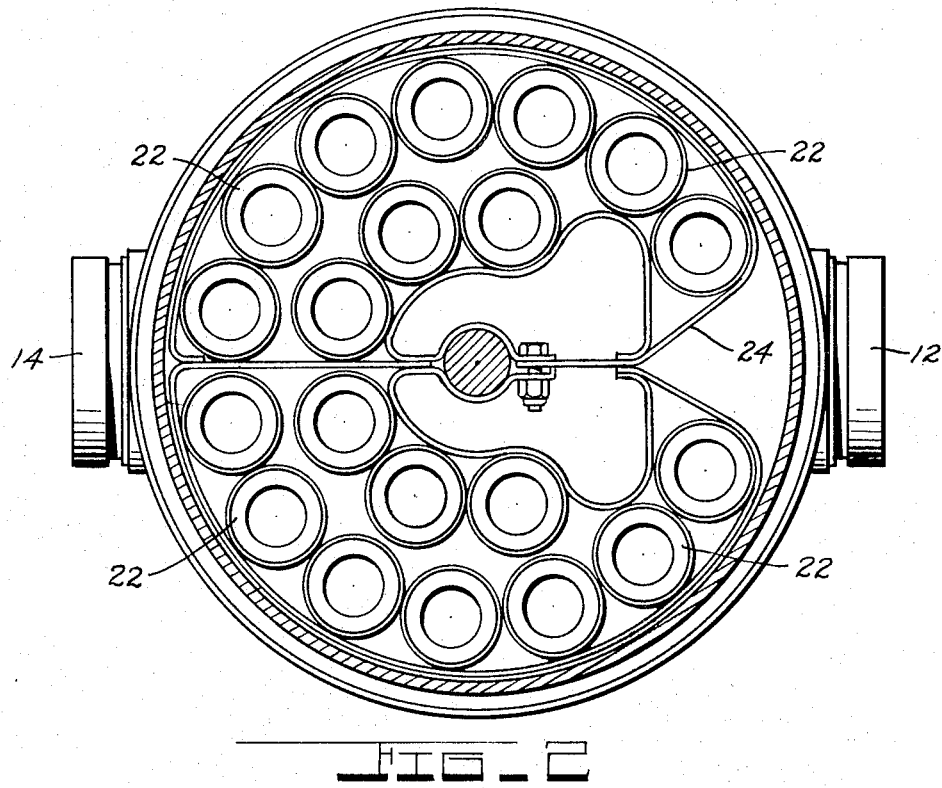
FIG_2
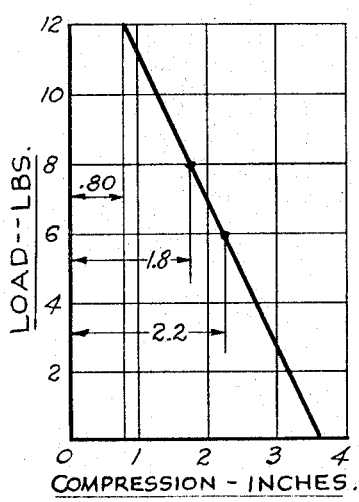
CURVE OF
FUSE PISTON SPRING
FIG_3
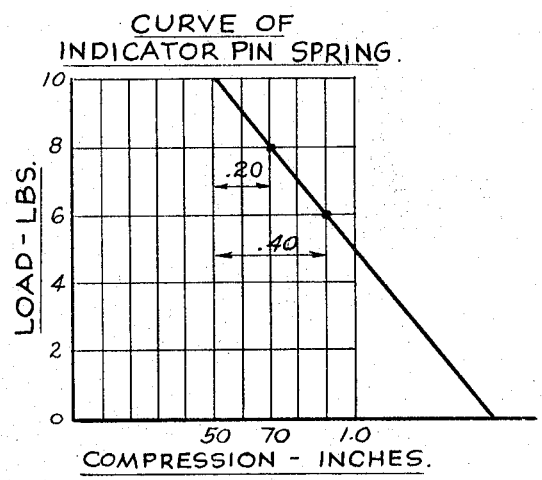
FIG_4
INVENTOR.
WALTER KASTEN.
BY
*William N. Antonis*
ATTORNEY.

Jan. 9, 1968 W. KASTEN 3,362,535
FILTER UNIT
Filed Sept. 27, 1965 3 Sheets-Sheet 3
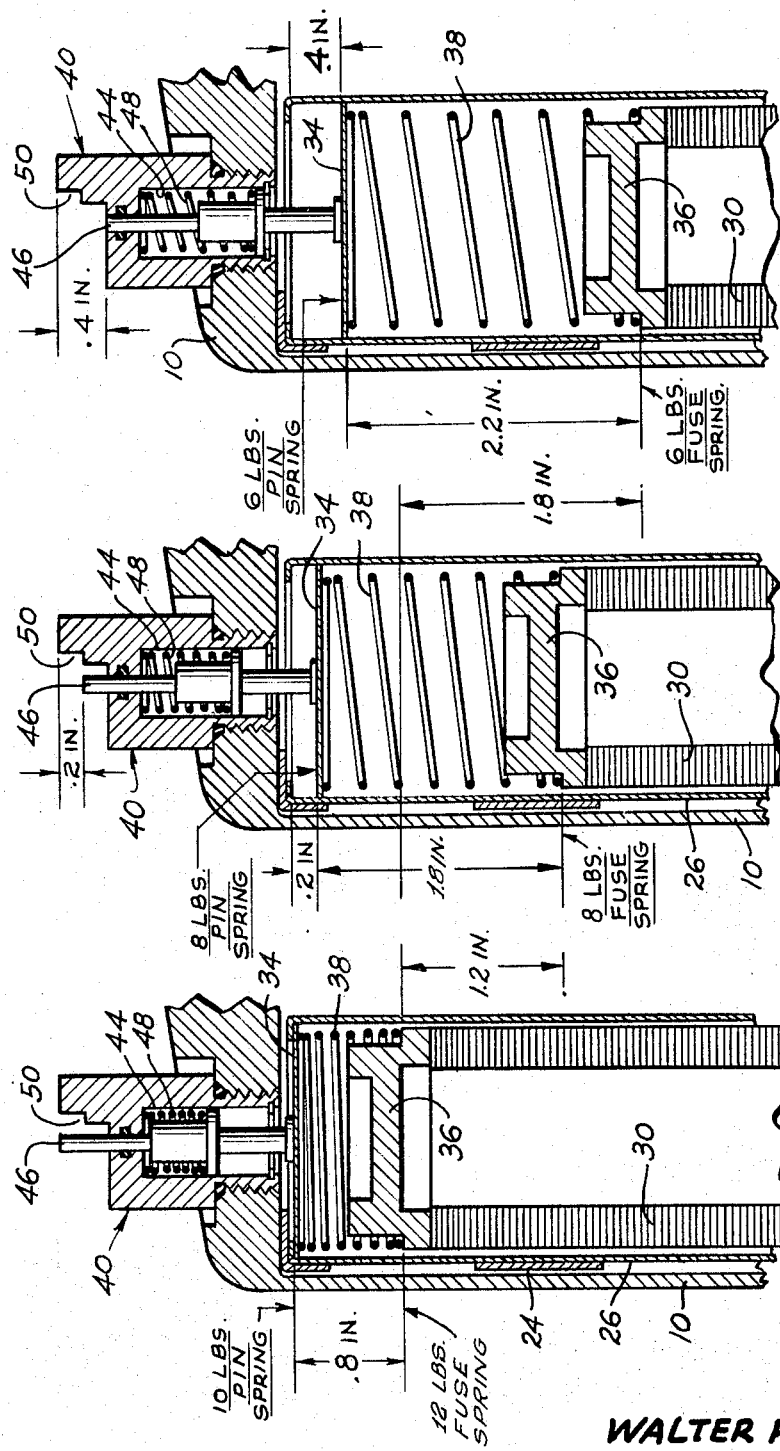

+# United States Patent Office 3,362,535
Patented Jan. 9, 1968

3,362,535
FILTER UNIT
Walter Kasten, Madison Heights, Mich., assignor to The Bendix Corporation, a corporation of Delaware
Filed Sept. 27, 1965, Ser. No. 490,379
5 Claims. (Cl. 210—90)

ABSTRACT OF THE DISCLOSURE

A filtering or fuel monitoring device which includes means for automatically indicating the absence of one or more filter elements from the device and/or indicating the condition of each of the filter elements within the device. The indicating means includes a plurality of multiple position indicator pins, one of which is associated with each of the filter elements in the device, wherein the position of each indicator pin indicates the absence of its associated filtering element or the necessity for replacing same during the course of use.

---

This invention relates to a filter unit of the type which may be used as a fuel monitoring device and more particularly to improvements in a fuel quality testing device of the type described in my Patent No. 3,117,925.

In any filtering or fuel monitoring device which utilizes one or more replaceable filter or fuse elements, there is always the possibility that during installation or servicing one or more of these elements will have been inadvertently left out of the device. If such an omission were to occur, obviously the device would not function properly, since some of the fuel would be able to flow therethrough without being checked for contaminants. Furthermore, since fuel monitoring devices of this type, because of their automatic contaminant checking features, are intended to eliminate, or at least reduce, the necessity for other periodic fuel contaminant checks (e.g. Millipore and Karl Fischer samplings), it is conceivable that simply seeing such a fuel monitoring device in a fuel system, even though not properly installed, could create a false sense of security on the part of the fueling operator.

Accordingly, it is an object of this invention to provide a filtering or fuel monitoring device which includes means for automatically indicating the absence of one or more filter or fuse elements from the device.

Another object of this invention is to provide a device of the type described wherein the means for indicating the absence of one or more of the filter or fuse elements is less expensive than known "fool proof" mechanisms used in this type of device, such as the one described and claimed in my copending patent application Ser. No. 378,567, now U.S. Patent No. 3,317,048.

In devices of the type described, it is also important that the operator thereof be warned regarding the condition of the fuse elements so that he will have ample time to replace the fuse elements before they "trigger" and prevent flow therethrough. Past experience has indicated that, by the time the pressure drop through the device reaches 20 to 25 p.s.i., about 80% of the fuse element life will have been reached. If the fuse elements are then replaced, the operator will never get in the embarrassing position of a complete shutdown. Although the installation of a reliable pressure differential gage could be utilized to indicate the condition of the fuse elements collectively, such gages are expensive and in many instances cost as much as the whole fuel monitoring device.

Accordingly, a further object of this invention is to provide a device of the type described wherein the means for indicating the absence of one or more of the filter or fuse elements also indicates the condition of each of the elements within the device.

More specifically, it is an object of this invention to provide a device of the type described which includes a plurality of indicator pins, one of which is associated with each of the filter or fuse elements therein, for indicating the absence of the associated element and for indicating whether said associated element needs replacing during the course of its use.

The above and other objects and features of this invention will become apparent from the following description taken in connection with the accompanying drawings which form a part of this specification and in which:

FIGURE 2 is a sectional view taken along line 2—2 of FIGURE 1;

FIGURE 3 is a graph showing load versus fuse piston spring length;

FIGURE 4 is a graph showing load versus indicator pin spring length; and

FIGURES 5, 6 and 7 are enlarged fragmentary sectional views of my invention in progressive indicating positions.

Figure 1:
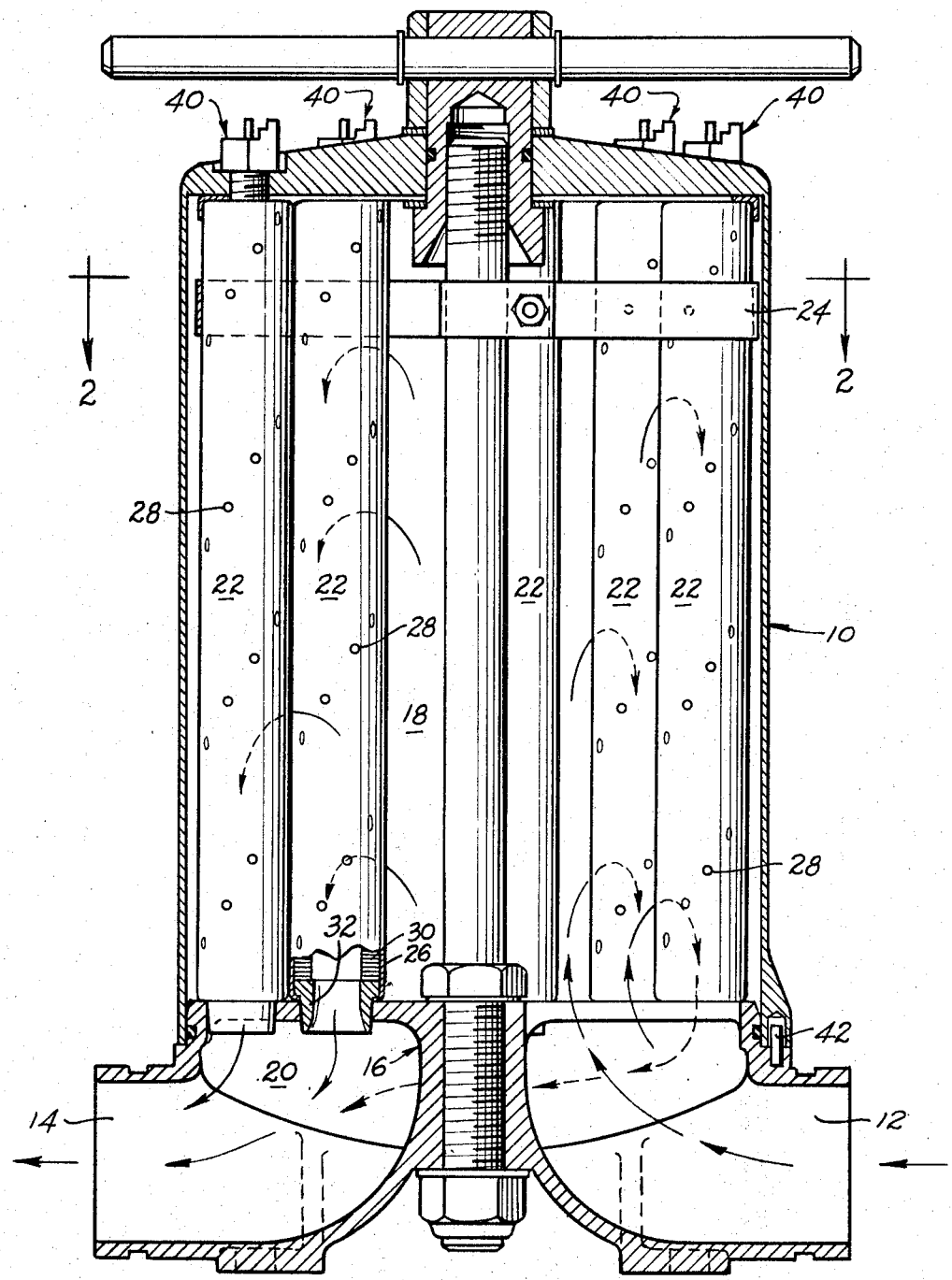
FIGURE 1 is a view partially in section of a fuel monitoring device incorporating my invention.

Referring to FIGURES 1, 2, 5, 6 and 7 of the drawings, it will be seen that numeral 10 indicates a two piece housing having a fuel inlet port 12 and a fuel outlet port 14 located in the lower part of the housing. Also, located within the lower part of the housing are suitable partition means, indicated generally by the numeral 16, which separate the interior of the housing into an inlet chamber 18 and an outlet chamber 20. A plurality of filter or fuse assemblies 22 are attached to the plate portion of the partition means 16 and are retained in position by the fuse locating band 24 and the upper part of the housing. The direction of flow through the unit is indicated by the arrows.

Each filter or fuse assembly 22 includes a metal tube 26 having a plurality of perforated ports 28, a compressible porous tubular edge-type filter element 30 formed from a plurality of washers in registered face-to-face contact, a nipple-like ferrule 32 suitably connected to one end of the tube and in abutment with one end of the filter element, a movable retainer washer 34 located at the other end of the tube, a movable piston-like end plate 36 located within said tube and in abutment with the other end of the filter element, and a preloaded piston spring 38 located between said washer 34 and piston 36 for placing the edge type filter element under the desired calibrated precompression. The washers may be formed from paper, cellulose, or other suitable fibrous or non-fibrous materials, and are arranged so that flow through the filter element will be via the radially extending pores formed between the washers. The filter element may also be formed by utilizing a ribbon-like material wound edgewise. The method for winding and making the ribbon type element is disclosed and claimed in my Patent No. 2,421,704. In the arrangement shown in FIGURE 1, flow will be from outside the filter element to inside the filter element. For additional details regarding this type of fuse assembly reference may be made to my Patent No. 3,117,-925 and Patent No. 3,151,071.

Referring to FIGURES 1, 5, 6 and 7, it will be noted that a plurality of indicator units 40 are threaded into the top of the housing 10 and extend therefrom. These indicator units, which indicate the absence of and condition of the filter elements, are located so that one of them is operatively connected to each of the fuse elements 22, in a manner hereinafter described. In order to insure that the upper part of the housing and the indicator units are in the proper position relative to the fuse elements, it will be noted that the lower part of the housing is provided with an indexing pin, indicated by the numeral 42.

Each indicator unit 40 includes a stepped diameter bore 44 and a corresponding stepped diameter indicator pin 46 located therein. The indicator pin, which is in coaxial alignment with its asociated fuse element 22, has one end thereof in abutment with the retainer washer 34 and the other end thereof extending through the top of the housing to signal the absence of or condition of the associated fuse element. A preloaded indicator pin spring 48 is located in the stepped diameter bore between the shoulder formed therein and the shoulder formed on the stepped diameter indicator pin for urging the end of the pin against the retainer washer. Thus, it will be obvious that if a fuse element 22 is inadvertently left out of the housing, the lower end of the indicator pin will have nothing against which to abut and the preloaded spring 48 will cause the indicator pin to move to a position where the upper end thereof will not be visible to the operator. In this manner the operator will be alerted to the fact that a fuse element has been left out, even after the housing has been assembled.

It will be noted that flow of fluid through each fuse assembly 22 is from outside-in, as shown in FIGURE 1, and that as a result of such flow the piston-like endplate 36 is subjected to a pressure differential equal to the pressure drop across the filter element 30. Since the higher inlet pressure is communicated to the top-side of the end plate 36 and the lower outlet pressure is communicated to the opposite side of the endplate, the result will be to cause movement of the endplate towards the filter element and consequent additional compression of the filter element. With a new set of fuse elements, the fuse or piston spring 38 will be almost completely compressed, as shown in FIGURE 5, and will for the fuse length shown in the drawings exert a load of approximately 12 lbs. against the fuse piston 36. The reaction of this load will be taken by the spring retainer washer 34. The indicator pin spring 48, which is utilized, is designed to exert a load less than 12 lbs., in this instance for purposes of subsequent discussion, namely, 10 lbs. Obviously, with such a selection of spring loads, whenever a new fuse element is installed, the indicator pin 46 will be in its most exposed position, as shown in FIGURE 5. After about 50% of the useful fuse life is expended, the fuse washer stack 30 will have compressed about 1.2" (for a 15" fuse) and the fuse piston 36 will have moved toward the fuse nipple a like amount, as shown in FIGURE 6. Obviously, such movement of the fuse piston will cause a reduction in the load exerted by the fuse piston spring 38. Since the load exerted by this fuse spring will now be less than the 10 lb. load initially exerted by the indicator pin spring 48, the indicator pin spring will cause the retainer washer 34 to move downwardly, as shown in FIGURE 6, until the loads exerted by the opposing springs 38 and 48 are in equilibrium. In the example being discussed, the indicator pin 46 and retainer washer will have moved 0.2" and the two springs will each exert an 8 lb. force. The load versus spring length curves for both the fuse spring and indicator spring are shown in FIGURES 3 and 4.

Further movement of the fuse piston and compression of the washer stack, as shown in FIGURE 7, will continue to reduce the fuse spring load and will result in further downward movement of the indicator pin, the amount of such downward movement being determined by the load equilibrium point of the two opposing springs. In FIGURE 7, this equilibrium load is 6 lbs. and the amount of movement of the indicator pin and retainer washer is 0.4". By providing a visible reference scale 50, adjacent the indicator pin, to determine the amount of movement of the pin, the operator can easily determine the amount of fuse life which is left and whether one or more of the fuse elements should be replaced. It should be noted that the above load values and washer stack compressed lengths are utilized only by way of example and that these values would vary for different types of installations. However, in all installations the principle of operation would be the same.

Furthermore, although the indicator pin is not pressure balanced, by utilizing an indicator pin having a relatively small unbalanced area, it is possible to disregard, as negligible, any corrections that may be required.

Those acquainted with this art will readily understand that the invention set forth herein is not necessarily limited and restricted to the precise and exact details presented and that various changes and modifications may be resorted to without departing from the spirit of my invention. Accordingly, I do not desire to be limited to the specific details described herein primarily for purposes of illustration, but instead desire protection falling within the scope of the appended claims.

Having thus described the various features of the invention, what I claim as new and desire to secure by Letters Patent is:

1. A fluid filtering device comprising housing means having fluid inlet and outlet passage means, a plurality of filtering elements interposed between said inlet and outlet passage means for filtering the fluid flowing therebetween, said filtering elements each including a tube having a plurality of ports therein, a plurality of washer-like elements in registered face-to-face contact located within said tube to form a compressible tubular member having radially extending pores between said washer-like elements for permitting flow of fluid therethrough from outside said tubular member to inside said tubular member, a nipple-like member located at one end of said tube and in abutment with one end of said porous tubular member, a movable retainer washer located at the other end of said tube, a movable piston member located within said tube and in abutment with the other end of said porous tubular member, said piston member having one side thereof communicating with the fluid outside the tubular member and the other side thereof communicating with the fluid inside the tubular member so that when the differential pressure thereacross increases above a predetermined value the piston member will move and compress said tubular member to a shorter length, and a preloaded piston spring confined within said tube between said retainer washer and said piston member, and a plurality of indicator units extending from said housing means, one of which is operatively connected to each of said filtering elements, said indicator units each having a stepped diameter bore and a corresponding stepped diameter indicator pin located therein, said indicator pin having one end thereof in abutment with said retainer washer and the other end thereof in a signalling position, and a preloaded indicator pin spring located in said stepped diameter bore between the shoulder formed therein and the shoulder formed on said stepped diameter indicator pin for urging said one end of said pin against said retainer washer, said signalling position of said other end of said indicator pin being determined by the position of said movable piston member and the reduced load of said piston spring resulting from movement of said piston member.

2. A fluid filtering device comprising housing means having fluid inlet and outlet passage means, a filtering element interposed between said inlet and outlet passage means for filtering fluid flowing therebetween, said filtering element including a tube having a plurality of ports therein, a layered edge-type compressible tubular member located within said tube, said tubular member having radially extending pores formed between said layers for permitting flow of fluid therethrough from outside said tubular member to inside said tubular member, a nipple-like member located at one end of said tube and in abutment with one end of said porous tubular member, a movable retainer washer located at the other end of said tube, a movable piston member located within said tube and in abutment with the other end of said porous tubular member, said piston member having one side thereof communicating with the fluid outside the tubular member and the other side thereof communicating with the fluid inside the tubular member so that when the differential pressure thereacross increases above a predetermined value the piston member will move and compress said tubular member to a shorter length, and a preloaded piston spring confined within said tube between said retainer washer and said piston member, and an indicator unit extending from said housing means, said indicator unit having a stepped diameter bore and a corresponding stepped diameter indicator pin located therein, said indicator pin having one end thereof in abutment with said retainer washer and the other end thereof in a signalling position, and a preloaded indicator pin spring located in said stepped diameter bore between the shoulder formed therein and the shoulder formed on said stepped diameter pin for urging said one end of said pin against said retainer washer, said signalling position of said other end of said indicator pin being determined by the position of said movable piston member and the reduced load of said piston spring resulting from movement of said piston member.

3. A fluid filtering device comprising housing means having fluid inlet and outlet passage means, a filtering element interposed between said inlet and outlet passage means for filtering fluid flowing therebetween, said filtering element including a layered edge-type compressible tubular member having radially extending pores formed between said layers for permitting flow of fluid therethrough from outside said tubular member to inside said tubular member, said tubular member having one end thereof in abutment with said housing means, a movable piston member in abutment with the other end of said tubular member, said piston member having one side thereof communicating with the fluid outside the tubular member and the other side thereof communicating with the fluid inside the tubular member so that when the differential pressure thereacross increases above a predetermined value the piston member will move and compress said tubular member to a shorter length, and first preloaded resilient compression means confined between said housing means and said piston member, and an indicator unit operatively connected to said housing means, said indicator unit having a bore and an indicator pin located therein, said indicator pin having one end thereof in abutment with said first resilient means and the other end thereof in a signalling position, and second preloaded resilient compression means located in said bore and operatively connected to said indicator pin for urging said one end of said pin against said first resilient compression means, said signalling position of said other end of said indicator pin being determined by the position of said movable piston member and the reduced load of said first resilient compression means resulting from movement of said piston member.

4. A fluid filtering device comprising housing means having fluid inlet and outlet passage means, an edge-type compressible tubular filtering element located in said housing means between said fluid inlet and outlet passage means so that the outside thereof communicates with said inlet passage means and the inside thereof communicates with said outlet passage means, said tubular element having one end thereof in abutment with said housing means, a movable piston member in abutment with the other end of said tubular element, said piston member having one side thereof communicating with the fluid inlet passage and the other side thereof communicating with the fluid outlet passage so that a predetermined increase in the pressure differential acting across said piston member will cause movement of said piston member and compression of said tubular element to a shorter length, spring means operatively connected to said piston member for urging said piston member against said tubular element, and an indicator unit operatively connected to said housing means for indicating the absence of or condition of said filtering element, said indicator unit having a multiple position signalling member located therein and operatively connected to said piston member, and means for urging said signalling member towards said piston member, said signalling position of said signalling member being determined by the absence of said filtering element from within said housing means or the position of said movable piston member.

5. A fluid filtering device comprising housing means having fluid inlet and outlet passage means, an edge-type compressible tubular filtering element of the outside-in type located in said housing means between said inlet and outlet passage means, said filtering element being progressively compressed to shorter lengths as the differential pressure thereacross increases above a predetermined value, and indicating means operatively connected to said housing means for indicating the absence of or condition of said filter element, said indicating means including a multiple position signalling member operatively connected to the end of said filtering element which is caused to move upon compression of said element, and means for urging said signalling member towards said filtering element, said signalling position of said member being determined by the absence of said filtering element from within said housing means or the position of the movable end of said filtering element.

No references cited.

SAMIH N. ZAHARNA, *Primary Examiner.*